(12) United States Patent
Mason

(10) Patent No.: US 8,700,463 B2
(45) Date of Patent: Apr. 15, 2014

(54) ADVERTISEMENT GENERATION AND OPTIMIZATION

(75) Inventor: Zachary Mason, Palo Alto, CA (US)

(73) Assignee: Adobe Systems Incorporated, San Jose, CA (US)

( * ) Notice: Subject to any disclaimer, the term of this patent is extended or adjusted under 35 U.S.C. 154(b) by 161 days.

(21) Appl. No.: 12/901,381

(22) Filed: Oct. 8, 2010

(65) Prior Publication Data

US 2011/0029375 A1    Feb. 3, 2011

Related U.S. Application Data

(63) Continuation of application No. 11/741,183, filed on Apr. 27, 2007, now abandoned.

(60) Provisional application No. 60/827,252, filed on Sep. 28, 2006, provisional application No. 60/795,416, filed on Apr. 27, 2006.

(51) Int. Cl.
*G06Q 30/00* (2012.01)
*G06Q 10/00* (2012.01)

(52) U.S. Cl.
USPC ............ 705/14.42; 705/14.43; 705/1.1

(58) Field of Classification Search
USPC ............... 705/14.42, 14.73, 10, 1.1
See application file for complete search history.

(56) References Cited

U.S. PATENT DOCUMENTS

| 2005/0050097 A1* | 3/2005 | Yeh et al. ............... 707/104.1 |
| 2007/0050389 A1* | 3/2007 | Kim et al. ............... 707/101 |
| 2007/0130004 A1* | 6/2007 | Borgs et al. ............. 705/14 |

* cited by examiner

*Primary Examiner* — Sun Li
(74) *Attorney, Agent, or Firm* — Kilpatrick Townsend & Stockon LLP

(57) ABSTRACT

Methods, apparatuses, and articles of manufacture for generating advertisements using an algorithmic system, such as a combinatoric system, and determining effectiveness metrics or predictions for the advertisements are described herein.

20 Claims, 3 Drawing Sheets

US 8,700,463 B2

ADVERTISEMENT GENERATION AND OPTIMIZATION

RELATED APPLICATIONS

The present application is a continuation of U.S. patent application Ser. No. 11/741,183, entitled "Advertisement Generation and Optimization" and filed Apr. 27, 2007, which claims the benefit of U.S. Provisional Applications 60/795,416, entitled "Advertisement Generation and Optimization", filed on Apr. 27, 2006 and 60/827,252, entitled "Dynamic Advertisement Generation", filed on Sep. 28, 2006. The specification of the 60/795,416 and 60/827,252 provisional applications are hereby fully incorporated by reference.

FIELD

The present invention relates generally to data processing. More specifically, the present invention relates to generating advertisements using an algorithmic system, and determining effectiveness metrics or predictions for the generated advertisements.

BACKGROUND

Search keyword advertisements may be associated with an ad copy. An ad copy may be a few lines of text that are in turn associated with a link to a bidding merchant's website. The performance/effectiveness of an advertisement may often depend on the associated ad copy. The few words comprising an ad copy, such as "Find Amazing Interest Rates & Low Costs—Apply Now for Fast Approval," may be the subject of substantial thought by copy-writers, who may manually generate the ad copy. Such ad copy, however, are typically selected with little or no empirical basis to predict or validate their effectiveness.

Similar problems are also posed by advertisements present in other media objects, such as television programs and video games. Various aspects of an advertisement in a media object, such as the speed of a car in a television advertisement, and the color of the car, may also require substantial efforts by advertisers, and may also lack an empirical basis for predicting or validating their effectiveness.

BRIEF DESCRIPTION OF THE DRAWINGS

The present invention will be described by way of exemplary embodiments, but not limitations, illustrated in the accompanying drawings in which like references denote similar elements, and in which.

DETAILED DESCRIPTION

Illustrative embodiments of the present invention include but are not limited to methods and apparatuses for receiving, by a computing device, at least one algorithmic expression, such as a combinatoric expression, for a plurality of advertisements, defined based on one or both of user inputs and/or computational-linguistic methods. In various embodiments, the computing device may then analyze the at least one algorithmic expression in view of one or more models of advertisement effectiveness to determine a subset of one or more advertisements of the plurality of advertisements as optimal among the plurality, (e.g. having the highest likelihood of effectiveness in accordance with an effectiveness model/function under certain constraints, such as cost). In other embodiments, a computer system may receive an advertisement generated based on such algorithmic expressions and evaluations for the plurality of advertisements or so generate such an advertisement. Also, in various embodiments, the computing device may then deploy and validate the "optimal" advertisement(s) by determining one or more metrics of effectiveness for the advertisement based on user reactions to the advertisement.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in one embodiment" is used repeatedly. The phrase generally does not refer to the same embodiment; however, it may. The terms "comprising," "having," and "including" are synonymous, unless the context dictates otherwise. The phrase "A/B" means "A or B". The phrase "A and/or B" means "(A), (B), or (A and B)". The phrase "at least one of A, B and C" means "(A), (B), (C), (A and B), (A and C), (B and C) or (A, B and C)". The phrase "(A)B" means "(B) or (A B)", that is, A is optional.

Figure 1:
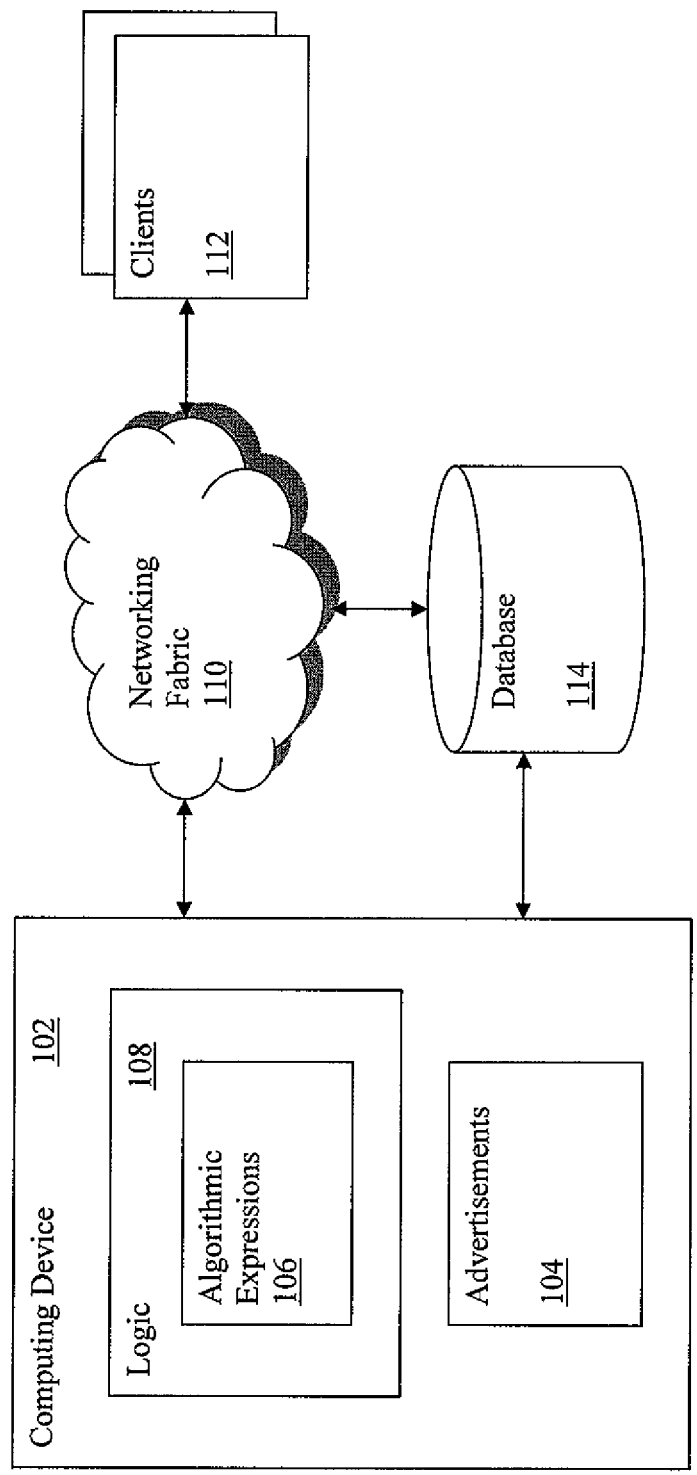
FIG. 1 illustrates an overview of the invention, in accordance with various embodiments.

FIG. 1 illustrates an overview of the invention, in accordance with various embodiments. As illustrated, a computing device 102 may receive at least one algorithmic expression 106 indirectly expressing a plurality of advertisements 104. In various embodiments, the algorithmic expression 106 may have been defined on computing device 102 or on another computing device based on one or both of user inputs and/or computational-linguistic methods. Logic 108 of the computing device 102 may then generate an advertisement 104 (based on algorithmic expression 106) for informational purposes, or may analyze the advertisements implicitly represented by algorithmic expression 106 in view of one or more models of advertisement effectiveness to determine and generate an optimal advertisement or advertisements 104, with what is considered "optimal" varying from embodiment to embodiment, depending on the effectiveness model/function employed as well as the constraints, if any, imposed. If generated to be informational, the advertisement 104 may be deployed by logic 108 on a networking fabric 110, such as the Internet, to determine one or more metrics of effectiveness to associate with the "optimal" advertisement(s) based on user reactions to the advertisement 104. Such user reactions may be input through clients 112, which may include web browsers and other software and devices capable of determining user reactions and providing those reactions to computing device 102. Computing device 102 may then store the determined metrics of effectiveness and their association with advertisement(s) 104 in database 114, enhancing, in some embodiments, the models of advertisement effectiveness to be employed for future evaluations/assessments.

In one embodiment, client 112 may be a device adapted to render a media object, the media object having one or more locations for the placement of advertisements 104. In such an embodiment, client 112 may be provided with a plurality of advertisements 104 implicitly represented by algorithmic expression 106 for one or more locations in the media object, and may determine one or more advertisements for placement into one or more locations within the media object by analyzing algorithmic expression 106 in view of one or more user characteristic and/or usage pattern models.

Figure 3:
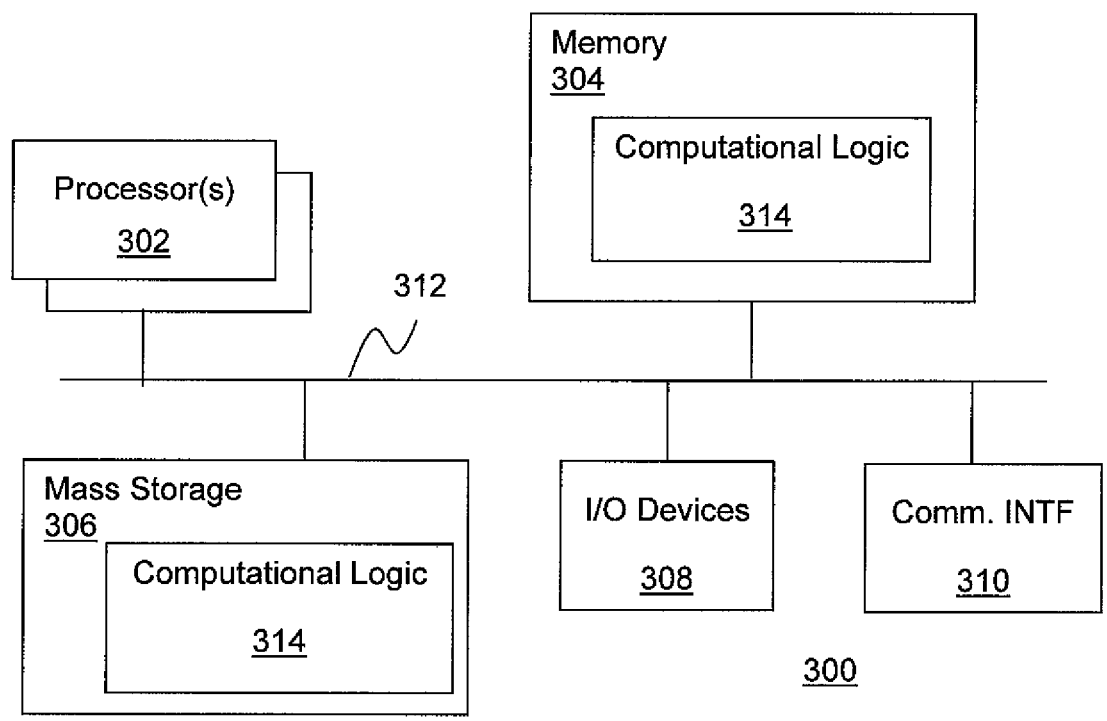
FIG. 3 illustrates an exemplary computing device capable of performing the operations of various embodiments of the present invention.

In various embodiments, the computing device 102 described above may comprise any single- or multi-processor or processor core central processing unit (CPU) computing system. The computing device 102 may be a personal computer (PC), a workstation, a server, a router, a mainframe, a modular computer within a blade server or high-density server, a personal digital assistant (PDA), an entertainment center, a set-top box, a media player, or a mobile device. Computing device 102 may be capable of operating a plurality of operating systems (OS) in a plurality of virtual machines using virtualization technologies. An exemplary single-/multi-processor or processor core computing device 102 is illustrated by FIG. 3, and is described in greater detail below. Hereinafter, including in the claims, processor and processor core shall be used interchangeable, with each term including the other. Any or all of the advertisements 104, algorithmic expression 106, and logic 108 may be local to the computing device 102, as shown, or may be stored remotely and accessed via networking fabric 110 or another networking fabric. Also, in various embodiments, database 114 and models of advertisement effectiveness may also be local to computing device 102.

In various embodiments, advertisements 104 may be any sort of advertisements known in the art. In one embodiment advertisements 104 may comprise a plurality of ad copy to be displayed on a search results page returned by a search engine. As mentioned above, each ad copy may be a few lines of text that are in turn associated with a link to a bidding merchant's website. Exemplary ad copy include phrases such as "Find amazing interest rates and low costs—Apply now for fast approval!" and "Network of 1500 mortgage lenders—Find offers, regardless of credit." In other embodiments, advertisements 104 may be banner advertisements, audio segments, video segments, and/or audiovisual segments. Such advertisements 104 may be placed in media objects, such as television programs, video games, movies, and songs. In various embodiments, advertisements 104 may be present on computing device 102, as shown. In other embodiments, advertisements 104 may be located on a remote device an may be retrieved by computing device 102 and/or clients 112 for display on a search results page or placement within a media object, for example. In one embodiment, advertisements 104 may be stored in database 114.

As shown, logic 108 of computing device 102 may receive or generate at least one algorithmic expression 106. In various embodiments, the at least one algorithmic expression 106 may be defined based on one or both of user inputs and/or computational-linguistic methods. Computing device 102 or another computing device may facilitate a user in defining the algorithmic expression 106 by receiving user inputs. In some embodiments, where advertisements 104 are ad copy, algorithmic expression 106 may be a combinatoric expression comprising a rule/base ad copy having advertisement variables, each advertisement variable associated with multiple advertisement variable values. The user may provide text inputs, such as terms or phrases, to build the rule, and may even specify the entire expression 106. The computing device may facilitate the user in manually doing so through a word processing program, for example. In other embodiments, the algorithmic expression 106 may comprise one or more of context free grammars, context sensitive grammars, and/or general programs.

In other embodiments, the computing device 102 or another computing device may automatically define algorithmic expression 106. The computing device may automatically define expression 106 by analyzing existing advertisements 104 and/or through computational-linguistic methods known in the art, such as image and speech recognition. In some embodiments, where advertisements 104 are audio and/or video segments, such as commercials, the computing device may automatically define a combinatoric decomposition of the advertisements 104. For example, if the advertisements include a car commercial, the combinatoric decomposition may note the objects in the advertisement 104, such as the car, and features of the object, such as a color, its model, travel direction, speed, and so forth. This combinatoric decomposition may then be used to define the algorithmic expression 106, automatically creating a rule for, e.g., the car object, the rule having a variable for color, and the variable color having multiple colors as values, including the color of the car in the advertisement 104 used for the combinatoric decomposition. The rule may also have a variable for the model, traveling direction, speed etc., with each variable having a number or range of permissible values. The resultant expression 106 may then be used to determined and generate the advertisement 104 with the car having a different model, color, traveling in one or more directions, at one or more speeds and so forth, and may deploy that advertisement 104 to determine effectiveness metrics with the different color.

In one embodiment, computing device 102 may facilitate a user in reviewing the algorithmic expression 106 for legal purposes. For example, a user may want or need to review the expression 106 to make sure that it won't generate advertisements 104 which make claims that the advertiser cannot sustain.

In various embodiments, as described above, advertisements 104 may be ad copy. Ad copy, such as the examples given above, may be generated from the following algorithmic expression 106

"S→Find GOOD_ADJ Interest Rates for FINANCIAL_PRODUCT!!! GOOD_ADJ→Fantastic, Great, Terrific, Amazing, Fabulous FINANCIAL_PRODUCT→Home Loans, Mortgages, Refinancing."

In such an expression, GOOD_ADJ and FINANCIAL_PRODUCT may be advertising variables, and the terms fantastic, great, terrific, amazing, fabulous, home loans, mortgages, and refinancing may be advertising values, respectively, of the advertising variables. In various embodiments, advertising variables may represent a broad range of ad copy features, such as terms, phrases, nouns, adjectives, verbs, adverbs, spacing, capitalizations, or numbers and/or kinds of punctuation marks.

As is shown, computing device 102 may have logic 108 capable of receiving the at least one algorithmic expression 106 and/or advertisements 104 via an interface of the computing device 102, such as a networking interface. In other embodiments, as described above, computing device 102 may automatically define algorithmic expression 106 using computational-linguistic methods or facilitate a user in doing so though user inputs. Upon receiving the combinatoric expression, logic 108 may do one or both of (1) analyzing the expression 106 in view of one or more models of advertisement effectiveness to determine and generate one or more advertisements 104 that are considered "optimal", with what is considered "optimal" varying from embodiment to embodiment as described earlier; and/or (2) generating one or more advertisements 104 based on the expression 106 to deploy the advertisement(s) 104 and determine one or more metrics of effectiveness of the advertisement(s) 104 based on user reactions.

In embodiments, where logic 108 analyzes the expression 106 in view of one or more models of advertisement effectiveness, logic 108 may retrieve the one or more models from database 114. In alternate embodiments, the models may be integrated with logic 108. In some embodiments, where the expression 106 is associated with ad copy advertisements 104, the models may be based on empirical evaluations of previous ad copy, and may be used to determine the "optimally" effective ad copy for one or more measures/scores of ad copy effectiveness, such as click-through rates or conversions, with or without constraints, such as biographic data or demographic information. In some embodiments, machine learning techniques, which may be used to direct a search through the combinatoric space of an ad copy, may be used to find ad copy 104 that can be expected to have high metric scores when measured empirically. Using such techniques may require assumptions about the kind of mathematical functions from which an advertisement's effectiveness can be computed from its text. Upon finding such ad copy, logic 108 may generate one or more of them. In other embodiments, logic 108 may first generate advertisements 104 and may then determine which of the generated advertisements 104 is "optimal" by comparing the advertisements to other advertisements for which effectiveness metrics are known.

In one embodiment, constraints/filters on effectiveness metrics, such as biographical data of searchers, may include age, gender, income, and other relevant metrics useful for demographic grouping. The data may be placed into demographically defined bins, the bins capable of facilitating demographic customizing of effectiveness metrics. Such biographic data may also be stored in and retrieved from database 114.

In embodiments where logic 108 generates advertisements 104 for informational purposes, to be deployed, logic 108 may generate a plurality of advertisements corresponding to a set of combinations of advertisement values produced by the algorithmic expression 106, and may then deploy each of these. In one embodiment, after generating all the advertisements, logic 108 may determine if any are similar to known advertisements for which metrics are known, as described above. Those that are found to be similar need not be deployed. In one embodiment, an algorithm may be used in generating advertisements 104 to maximize the expected information pay-off over time.

In various embodiments, the generated advertisements 104, such as ad copy, may then be deployed and evaluated to determine one or more effectiveness metrics/scores based on user reactions to the advertisements 104. The ad copy may be deployed online and accessed through keyword searches on a search engine, such as Google or Overture. Effectiveness metrics/scores determined may include click-through rates, revenue generated, or other metrics often used in the art. The click-through rate and revenue generated may be very strong indicators of advertisement "success," with what is considered "success" varying from embodiment to embodiment. Effectiveness metrics determined may also include other indicators, such as mouse-over events for search advertisements, and data from passive gaze-tracking systems. Logic 108 may monitor clients 112 to gather such metrics itself or may passively receive the metrics from the clients 112. Upon determining new metrics for an advertisement 104, logic 108 may store the metrics in database 114 to further enhance models of advertising effectiveness.

In some embodiments, logic 108 may determine and generate a plurality of candidate advertisements 104 for placement within media objects having a plurality of locations where one of the advertisements 104 may be placed and presented with the media object. In such embodiments, logic 108 may retrieve user characteristics and/or usage patterns from clients 112 and/or database 114 and may analyze the algorithmic expression 106 in view of the user characteristics and/or usage patterns to determine the advertisement to place within the media object. Such user characteristics and usage patterns may include viewer tastes, preferences, and habits. In one embodiment, logic 108 may select two or more advertisements 104 and may auction the advertisement placement to the highest bidding advertiser associated with the two or more advertisements 104. After logic 108 or the auction-winner/advertiser select the advertisement to be placed in the media object, logic 108 may send a bill to a broadcast server via networking fabric 110 notifying the advertiser associated with the presented advertisement 104 of the billing event. In other embodiments, the advertisements 104 may have been determined and placed by clients 112, and logic 108 may simply provide the generated advertisement and algorithmic expression 106 to the clients 112.

As illustrated, computing device 102 and clients 112 may be connected to a networking fabric 110. Networking fabric 110 may be any sort of networking fabric known in the art, such as one or more of a local area network (LAN), a wide area network (WAN), and the Internet. Computing device 102 and clients 112 may communicate via networking fabric 110 and may further use any communication protocol known in the art, such as the Hypertext Transfer Protocol (HTTP), and any transport protocol known in the art, such as the Transmission Control Protocol/Internet Protocol (TCP/IP) suite of protocols. In various embodiments, networking fabric 110 may also be connection to an application server providing search services. Such an application server may return search results pages to clients 112, the search results pages including advertisement 104, which, as described above, may be an ad copy. And in some embodiments, networking fabric may also connect one or both of computing device 102 and clients 112 to a remote billing server to provide that server with notifications of billing events.

In various embodiments, clients 112 may be any one or more computing devices, peripheral devices, and/or processes known in the art. Clients 112 may facilitate a user in passively and/or actively interacting with advertisements 104. In some embodiments, where advertisements 104 are ad copy, clients 112 may comprise a web browser capable of receiving and rendering a search results page of a search engine that includes advertisements 104. Such clients 112 may render the search results page in response to a search by the user based on a word or words input by the user. In some embodiments, computing device 102 or clients 112 may then track reactions of the user to the advertisements, including mouse clicks to websites associated with the advertisements, transactions with the advertiser associated with the advertisement, gazes of the user at the advertisement (if clients 112 comprise a device capable of tracking user eyeball positions and movements). If clients 112 are tracking user reactions, they may report those reactions to computing device 102 or directly to database 114 either periodically or in real-time. In other embodiments, where advertisements 104 are commercials or some other advertisement type, media objects having the advertisements 104 may allow users to "click through" (that is, in some way indicate interest or take action regarding) an advertisement 104 of the media object.

In some embodiments, clients 112 may be adapted to play media objects having a plurality of locations where one of a plurality of candidate advertisements 104 may be placed and presented with the media object. In such embodiments, clients 112 may receive the media object along with the plurality of candidate advertisements 104 and an algorithmic expression 106. Clients 112 may then analyze the algorithmic expressions 106 in view of user characteristics and/or usage patterns to determine one or more of the candidate advertisements 104 for placement in the media object. As described above, such user characteristics and usage patterns may include viewer tastes, preferences, and habits. In one embodiment, clients 112 may select two or more advertisements 104 and may auction the advertisement placement to the highest bidding advertiser associated with the two or more advertisements 104. After clients 112 or the auction-winner/advertiser select the advertisement to be placed in the media object, clients 112 may send a bill to a broadcast server via networking fabric 110 notifying the advertiser associated with the presented advertisement 104 of the bill event.

As illustrated, database 114 may be remotely disposed on a database server or other sort of computer system, or, in some embodiments, may be stored locally on computing device 102. Database 114 may be any sort of database known in the art, such as a relational database, a normalized database, a de-normalized database, or even an unstructured file. As described above, database 114 may store one or more metrics of effectiveness associated with advertisements 104, and may store either or both of information indicating the associations and/or the advertisements 114 themselves. Such metrics and information may be provided to database 114 by one of the computing device 102 or clients 112 as the information and metrics are determined, and may then be stored by the database 114. Also, as described above, database 114 may store one or more models of advertisement effectiveness, which may include the metrics of effectiveness and, for example, machine learning methods.

Figure 2A:
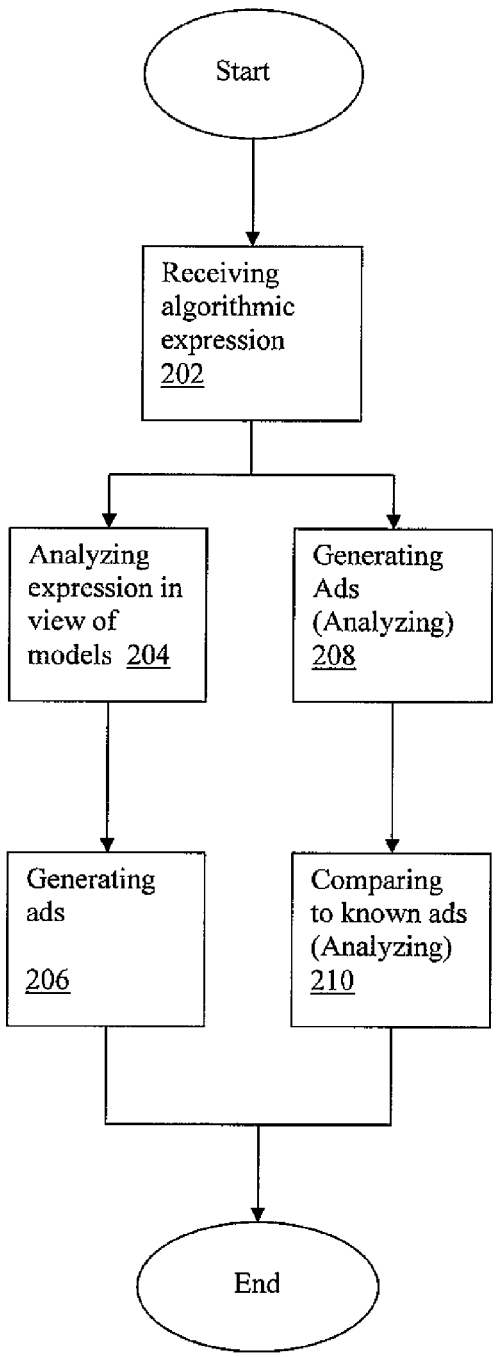
FIGS. 2a-2b are flow charts depicting various embodiments of the invention.
Figure 2B:
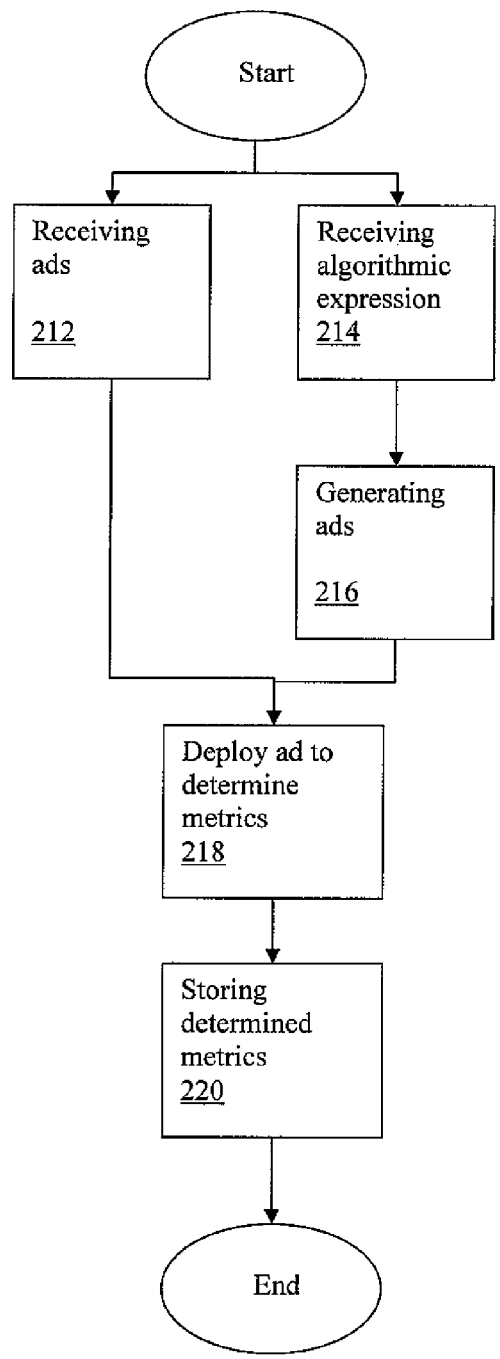

FIGS. 2a-2b are flow charts depicting various embodiments of the invention. FIG. 2a is a flow chart view of one embodiment of the invention, where an algorithmic expression is analyzed by logic of a computing device in view of one or more models of advertising effectiveness to determine and generate an advertisement. As illustrated, the computing device may first receive at least one algorithmic expression associated with a plurality of advertisements, block 202, the algorithmic expression defined based on one or both of user inputs and/or computational-linguistic methods. In various embodiments, the plurality of advertisements may be ad copy and the at least one algorithmic expression may be a combinatoric expression comprising a base ad copy and a plurality of advertisement variables. In such embodiments, the plurality of advertisement variables may include at least one of a term, a phrase, a noun, an adjective, a verb, an adverb, spacing, capitalization, or number and/or kind of punctuation marks. In other embodiments, the plurality of advertisements may be candidate advertisements for placement within a media object, and the models of advertisement effectiveness may include user characteristics and/or usage patterns.

Upon receiving the at least one algorithmic expression, logic of the computing device may either (1) analyze the algorithmic expression in view of one or more models of advertising effectiveness to determine an advertisement, block 204, and then generate the determined advertisement, block 206, or (2) first generate a plurality of possible advertisements, such as ad copy, having differing values for an advertisement variable of the at least one algorithmic expression, block 208, and then compare the advertisements to other advertisements for which effectiveness metrics are known, block 210. In various embodiments, the one or more models of advertisement effectiveness may be based on previous empirical evaluations of other advertisements, and the other advertisements may be determined by machine learning methods. Further, in some embodiments, the effectiveness metrics may include click-through rate or conversions.

FIG. 2b is a flow chart view of another embodiment of the invention, where an advertisement is generated to be informational, and is deployed to determine one or more metrics of effectiveness based on user reactions. As illustrated, a computing device may either (1) receive an advertisement generated based on at least one algorithmic expression for a plurality of advertisements, block 212, or (2) may receive the at least one algorithmic expression for the plurality of advertisements, block 214, the expression defined based on one or both of user inputs and/or computational-linguistic methods, and may itself generate the advertisement based on the expression, block 216. In some embodiments, the computing device may generate the plurality of advertisements, including the advertisement, based on a plurality of combinations of values of at least one advertisement variable of the at least one algorithmic expression. In one embodiment, the plurality of advertisements may be ad copy and the at least one algorithmic expression may be a combinatoric expression comprising a base ad copy and a plurality of advertisement variables. In such an embodiment, the plurality of advertisement variables may include at least one of a term, a phrase, a noun, an adjective, a verb, an adverb, spacing, capitalization, or number and/or kind of punctuation marks.

Upon receiving or generating the advertisement, the computing device may deploy the advertisement to determine one or more metrics of effectiveness to be associated with the advertisement based on user reactions to the advertisement, block 218. In various embodiments, the advertisement may be deployed online and accessible through keyword searches on search engines. In further embodiments, the one or more metrics of effectiveness may include at least one of click-through rates, conversions, revenue generated, mouse-over events, and passive gaze-tracking, and the user reactions may include at least one of mouse-clicks, gazing, and transactions. After deploying the advertisement to determine the metrics of effectiveness, the computing device may store the effectiveness metrics in a database, block 220, to enhance the above described one or more models of advertisement effectiveness.

FIG. 3 illustrates an exemplary computing device capable of performing the operations of various embodiments of the present invention. As shown, computing system/device 300 may include one or more processors 302, and system memory 304. Additionally, computing system/device 300 may include mass storage devices 306 (such as diskette, hard drive, CDROM and so forth), input/output devices 308 (such as keyboard, cursor control and so forth) and communication interfaces 310 (such as network interface cards, modems and so forth). The elements may be coupled to each other via system bus 312, which represents one or more buses. In the case of multiple buses, they may be bridged by one or more bus bridges (not shown).

System memory 304 and mass storage 306 may be employed to store a working copy and a permanent copy of the programming instructions implementing one or more aspects of the above described teachings to practice the present invention, such as computational logic 314. The programming instructions may be implemented in assembler instructions supported by processor(s) 302 or high level languages, such as C, that may be compiled into such instructions.

The permanent copy of the programming instructions may be placed into permanent storage 306 in the factory, or in the field, through e.g. a distribution medium (not shown) or through communication interface 310 (from a distribution server (not shown)).

Although specific embodiments have been illustrated and described herein for purposes of description of the preferred embodiment, it will be appreciated by those of ordinary skill in the art that a wide variety of alternate and/or equivalent implementations may be substituted for the specific embodiment shown and described without departing from the scope of the present invention. Those with skill in the art will readily appreciate that the present invention may be implemented in a very wide variety of embodiments. This application is intended to cover any adaptations or variations of the embodiments discussed herein. Therefore, it is manifestly intended that this invention be limited only by the claims and the equivalents thereof.

What is claimed is:

1. A method comprising:
generating, by a computing device, at least one combinatoric algorithmic expression of a plurality of audiovisual segment advertisements, wherein the combinatoric algorithmic expression comprises a base ad audiovisual segment copy and a plurality of advertisement variables, wherein the combinatoric algorithmic expression defines combinations of elements of the base ad audiovisual segment copy, wherein at least one of the advertisement variables controls one or more movements of one or more visual elements within the audiovisual segment copy;
analyzing, by the computing device, the at least one combinatoric algorithmic expression in view of one or more models of advertisement effectiveness with respect to each of the plurality of advertisement variables for combining potential elements of the base ad audiovisual segment copy;
selecting via the at least one combinatoric algorithmic expression a combination of one or more of the potential elements of the base ad audiovisual segment copy as an advertisement of the plurality of advertisements; and
generating the advertisement from the combination of the one or more of the potential elements of the base ad audiovisual segment copy based on the selecting.

2. The method of claim 1, wherein the at least one combinatoric algorithmic expression is defined based on one or both of user inputs and computational-linguistic methods.

3. The method of claim 1, wherein said analyzing further comprises generating a number of ad copy, having differing values for an advertisement variable of the combinatoric algorithmic expression, and comparing each ad copy to at least one other ad copy for which one or more effectiveness metrics are known.

4. The method of claim 1, wherein the plurality of advertisements are candidate advertisements for placement within a media object, and the one or more models of advertisement effectiveness include user characteristics and usage patterns.

5. The method of claim 1, wherein the one or more models of advertisement effectiveness are based on previous empirical evaluations of other advertisements, and the other advertisements are determined by machine learning methods.

6. The method of claim 1, wherein the selecting is based at least in part on conversions.

7. The method of claim 1, wherein the audiovisual segment contains both audio and moving images.

8. The method of claim 1, wherein the combinatoric algorithmic expression describes color compositions of one or more visual elements within the audiovisual segment copy.

9. The method of claim 1, wherein the combinatoric algorithmic expression describes an audiovisual segment copy for placement in an audiovisual media object.

10. The method of claim 1, wherein the method further comprises facilitating a review of the combinatoric algorithmic expression for legal purposes.

11. A non-transitory computer-readable storage medium storing program instructions, wherein the program instructions are computer-executable to implement:
generating, by a computing device, at least one combinatoric algorithmic expression of a plurality of advertisements, wherein the combinatoric algorithmic expression comprises a base ad audiovisual segment copy and a plurality of advertisement variables, wherein the combinatoric algorithmic expression defines combinations of elements of the base ad audiovisual segment copy, wherein at least one of the advertisement variables controls one or more movements of one or more visual elements within the audiovisual segment copy;
analyzing, by the computing device, the at least one combinatoric algorithmic expression in view of one or more models of advertisement effectiveness with respect to each of the plurality of advertisement variables for combining potential elements of the base ad audiovisual segment copy;
selecting via the at least one combinatoric algorithmic expression a combination of one or more of the potential elements of the base ad audiovisual segment copy as an advertisement of the plurality of advertisements; and
generating the advertisement from the combination of the one or more of the potential elements of the base ad audiovisual segment copy based on the selecting.

12. The non-transitory computer-readable storage medium of claim 11, further comprising program instructions computer-executable to implement deploying, by the computing device, the advertisement to determine one or more metrics of effectiveness to be associated with the advertisement based on user reactions to the advertisement.

13. The non-transitory computer-readable storage medium of claim 11, wherein said program instructions computer-executable to implement said analyzing further comprise program instructions computer-executable to implement generating a number of ad copy having differing values for an advertisement variable of the combinatoric algorithmic expression, and comparing each ad copy to at least one other ad copy for which one or more effectiveness metrics are known.

14. The non-transitory computer-readable storage medium of claim 11, wherein the plurality of advertisement variables include at least one of a term, a phrase, a noun, an adjective, a verb, an adverb, spacing, capitalization, or number and kind of punctuation marks.

15. The non-transitory computer-readable storage medium of claim 11, wherein the one or more metrics of effectiveness include at least one of click-through rates, conversions, revenue generated, mouse-over events, and passive gaze-tracking, and the user reactions include at least one of mouse-clicks, gazing, and transactions.

16. The non-transitory computer-readable storage medium of claim 11, wherein the advertisement is deployed online and is accessible through keyword searches on search engines.

17. The non-transitory computer-readable storage medium of claim 11, further comprising storing the one or more metrics of effectiveness in a database.

18. An apparatus comprising:
a processor; and
a memory comprising program instructions, wherein the program instructions are executable by the at least one processor to:
generate at least one combinatoric algorithmic expression of a plurality of advertisements, wherein the combinatoric algorithmic expression comprises a base ad audiovisual segment copy and a plurality of advertisement variables, wherein the combinatoric algorithmic expression defines combinations of elements of the base ad audiovisual segment copy, wherein at least one of the advertisement variables controls one or more movements of one or more visual elements within the audiovisual segment copy;
analyze the at least one combinatoric algorithmic expression in view of one or more models of advertisement effectiveness with respect to each of the plurality of advertisement variables for combining potential elements of the base ad audiovisual segment copy;
select via the at least one combinatoric algorithmic expression a combination of one or more of the potential elements of the base ad audiovisual segment copy as an advertisement of the plurality of advertisements; and
generate the advertisement from the combination of the one or more of the potential elements of the base ad audiovisual segment copy based on the selecting.

19. The apparatus of claim 18, wherein the plurality of advertisements are ad copy and the at least one combinatoric algorithmic expression comprises a base ad copy and a plurality of advertisement variables.

20. The apparatus of claim 18, wherein the one or more metrics of effectiveness include at least one of click-through rates, conversions, revenue generated, mouse-over events, and passive gaze-tracking, and the user reactions include at least one of mouse-clicks, gazing, and transactions.

\* \* \* \* \*